US012558798B2

(12) United States Patent
Hiraguri et al.

(10) Patent No.: US 12,558,798 B2
(45) Date of Patent: *Feb. 24, 2026

(54) HOLDING DEVICE AND CONVEYING SYSTEM

(71) Applicant: Kabushiki Kaisha Toshiba, Tokyo (JP)

(72) Inventors: Kazuma Hiraguri, Yokohama (JP);
Taketo Shiba, Yokohama (JP);
Noriyuki Ooba, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 970 days.

This patent is subject to a terminal disclaimer.

(21) Appl. No.: 17/573,859

(22) Filed: Jan. 12, 2022

(65) Prior Publication Data

US 2022/0219336 A1 Jul. 14, 2022

(30) Foreign Application Priority Data

Jan. 14, 2021 (JP) ................................. 2021-004553

(51) Int. Cl.
B25J 15/00 (2006.01)
B25J 15/06 (2006.01)
B25J 17/02 (2006.01)
(52) U.S. Cl.
CPC ....... B25J 15/0052 (2013.01); B25J 15/0028 (2013.01); B25J 15/0691 (2013.01); B25J 17/02 (2013.01)
(58) Field of Classification Search
CPC ............... B25J 15/0052; B25J 15/0028; B25J 15/0691; B25J 15/0253; B25J 15/0616;
(Continued)

(56) References Cited

U.S. PATENT DOCUMENTS

| | | | |
|---|---|---|---|
| 8,777,552 B2 | 7/2014 | Ward et al. | |
| 9,833,903 B1 | 12/2017 | Kuffner | |

(Continued)

FOREIGN PATENT DOCUMENTS

| | | |
|---|---|---|
| CN | 110422301 A | 11/2019 |
| EP | 3 144 255 B1 | 12/2020 |

(Continued)

OTHER PUBLICATIONS

Japanese Office Action issued Apr. 23, 2024 in Japanese Application 2021-004553, (with unedited computer-generated English translation), 12 pages.

(Continued)

*Primary Examiner* — Stephen A Vu
(74) *Attorney, Agent, or Firm* — Oblon, McClelland, Maier & Neustadt, L.L.P.

(57) ABSTRACT

According to one embodiment, a holding device includes: a support member; a first holding unit having a first holding portion configured to hold a holding object; a second holding unit having a second holding portion configured to hold the holding object; and a controller configured to control an operation of the first holding unit and the second holding unit. The controller is configured to switch which of the first holding unit and the second holding unit is used for holding the holding object, by rotating the first holding unit and the second holding unit in a state where the first holding unit and the second holding unit face different directions, and control to change an orientation with respect to the support member, by rotating at least one of the first holding unit and the second holding unit with respect to the support member.

15 Claims, 13 Drawing Sheets

(58) Field of Classification Search
CPC .... B25J 15/0066; B25J 15/0213; B25J 15/08;
B25J 17/02; B25J 9/04
See application file for complete search history.

(56) References Cited

U.S. PATENT DOCUMENTS

| | | | |
|---|---|---|---|
| 10,556,338 B1 | 2/2020 | Marchese et al. | |
| 12,246,930 B2 * | 3/2025 | Shiba .................... | B25J 13/088 |
| 2012/0039699 A1 | 2/2012 | Ward et al. | |
| 2014/0163737 A1 * | 6/2014 | Nagata .................. | B25J 9/1697 |
| | | | 700/259 |
| 2015/0360370 A1 * | 12/2015 | Mazzocco ........... | B25J 15/0616 |
| | | | 294/119.1 |
| 2017/0313512 A1 * | 11/2017 | Miyagawa ............. | B65G 1/065 |
| 2018/0264658 A1 | 9/2018 | Tanaka et al. | |
| 2021/0253368 A1 * | 8/2021 | Ikeya .................... | B65G 43/00 |

FOREIGN PATENT DOCUMENTS

| | | | | | |
|---|---|---|---|---|---|
| JP | 60-190592 | U | 12/1985 | | |
| JP | 6-226671 | A | 8/1994 | | |
| JP | 8-71962 | A | 3/1996 | | |
| JP | 8-239199 | A | 9/1996 | | |
| JP | 2002-66861 | A | 3/2002 | | |
| JP | 2010-162638 | A | 7/2010 | | |
| JP | 2010-214510 | A | 9/2010 | | |
| JP | 2011-685 | A | 1/2011 | | |
| JP | 2011-56595 | A | 3/2011 | | |
| JP | 5346511 | B2 | 11/2013 | | |
| JP | 2014-208387 | A | 11/2014 | | |
| JP | 2018-153896 | A | 10/2018 | | |
| JP | 2020-79152 | A | 5/2020 | | |
| WO | WO 2013/027251 | A1 | 2/2013 | | |
| WO | WO-2014125360 | A1 * | 8/2014 | ........... | B25J 9/0051 |
| WO | WO 2018/029268 | A1 | 2/2018 | | |

OTHER PUBLICATIONS

Japanese Office Action issued Aug. 20, 2024 in Japanese Application 2021-004553, (with unedited computer-generated English translation), 11 pages.
Japanese Office Action issued Apr. 23, 2024, in Japanese Patent Application No. 2021-004554 (with unedited computer-generated English translation), 8 pages.
Office Action mailed Jul. 19, 2024, in U.S. Appl. No. 17/647,488, 15 pages.
Notice of Allowance mailed Nov. 19, 2024, in U.S. Appl. No. 17/647,488, 14 pages.

* cited by examiner

HOLDING DEVICE AND CONVEYING SYSTEM

CROSS-REFERENCE TO RELATED APPLICATION

This application is based upon and claims the benefit of priority from Japanese Patent Application No. 2021-004553, filed Jan. 14, 2021; the entire contents of (all of) which are incorporated herein by reference.

FIELD

Embodiments described herein relate generally to a holding device and a conveying system.

BACKGROUND

Conventionally, a picking robot having a robot hand having a plurality of holding units for holding an article is known. This type of picking robot can handle a variety of articles by properly using a plurality of holding units.

DETAILED DESCRIPTION

According to one embodiment, a holding device of an embodiment includes: a support member; a first holding unit configured to be rotatably supported by the support member and have a first holding portion configured to hold a holding object; a second holding unit configured to be rotatably supported by the support member independently of the first holding unit and have a second holding portion configured to hold the holding object; and a controller configured to control an operation of the first holding unit and the second holding unit. The controller is configured to switch which of the first holding unit and the second holding unit is used for holding the holding object, by rotating the first holding unit and the second holding unit in a state where the first holding unit and the second holding unit face different directions, and control to change an orientation with respect to the support member, by rotating at least one of the first holding unit and the second holding unit with respect to the support member.

Hereinafter, the holding device and the conveying system of an embodiment will be described with reference to the drawings.

The XYZ Cartesian coordinate system is used in the description of the holding device and the transporting device of the embodiment. The Z-axis direction corresponds to the vertical direction, the +Z direction is defined as upward, and the −Z direction is defined as downward. The X-axis direction and the Y-axis direction are orthogonal to each other in a horizontal plane. In the horizontal plane, the direction in which the holding claw of the holding unit, which will be described later, opens and closes is defined as the X-axis direction. In the horizontal plane, the direction orthogonal to the opening/closing direction of the holding claw is defined as the Y-axis direction.

Figure 1:
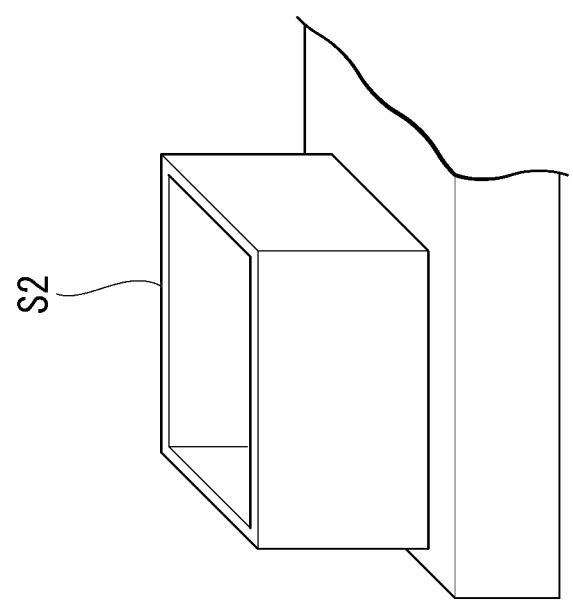
FIG. 1 is a schematic view of a picking robot according to an embodiment.
Figure 1:
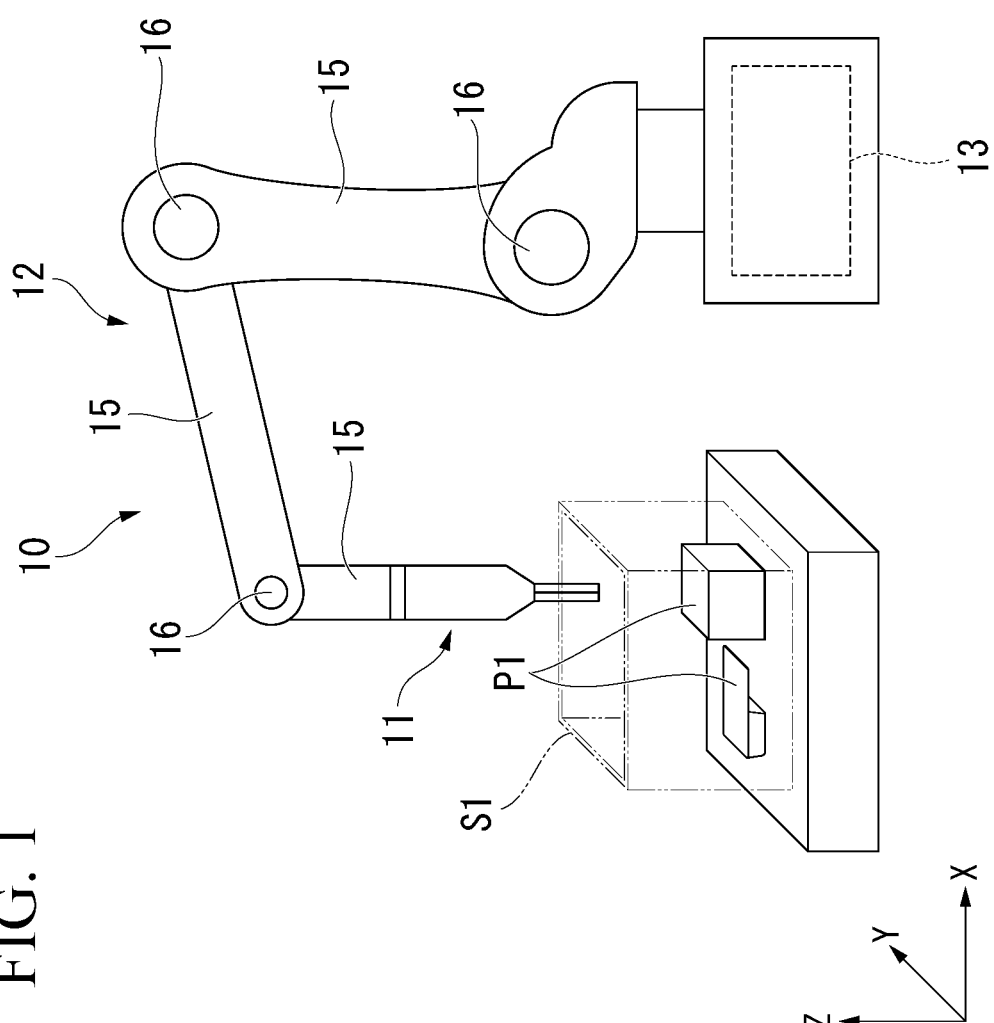

FIG. 1 is a schematic diagram showing a schematic configuration of the picking robot 10 of the present embodiment.

As shown in FIG. 1, the picking robot 10 includes a robot hand 11, an arm 12, and a controller 13. The robot hand 11 holds a holding object P that is a target of transportation. The arm 12 moves the robot hand 11 to a predetermined position. The controller 13 controls the robot hand 11 and the arm 12. More specifically, the controller 13 of the picking robot 10 controls the entire system. The controller includes a planning controller that plans the actions of the arm 12 and the robot hand 11, and an image processing controller that performs recognition processing such as camera information. The configuration of the robot hand 11 will be described in detail later.

The picking robot 10 of the present embodiment corresponds to a conveying system within the scope of claims. The robot hand 11 of the present embodiment corresponds to a holding device within the scope of claims.

The outline of the configuration and operation of the picking robot 10 will be described below.

The picking robot 10 is used, for example, as a picking robot for physical distribution. The picking robot 10 holds various holding objects P placed in various situations in the transport source S1 and moves them to the transport destination S2. The use of the picking robot 10 is not limited to logistics, but can be widely applied to industrial use, other uses, and the like. The picking robot 10 of the present embodiment is not limited to a device whose main purpose is to transport the holding object P, and also includes a device that transports or moves an article as a part of another purpose such as assembling a product.

The transport source S1 is, for example, various conveyors, pallets, containers, and the like, but is not limited thereto. A plurality of types of holding objects P having different dimensions and weights are placed at random positions in an arbitrary orientation on the transport source S1. In the present embodiment, the dimensions of the holding object P that is a target of transportation vary from, for example, about several cm square to about several tens of cm square. The weight of the holding object P varies from, for example, about several tens of g to about several kg. The dimensions and weight of the holding object P are not limited to the above examples.

The transport destination S2 is, for example, various conveyors, pallets, containers, or the like, as in the transport source S1, but is not limited thereto. The container of the transport source S1 and the transport destination S2 broadly means a member capable of accommodating the holding object P, for example, a box-shaped member.

The arm 12 is composed of, for example, 6-axis vertical articulated arm. The arm 12 includes a plurality of arm members 15 and a plurality of joint portions 16. The joint portion 16 rotatably connects the arm members 15 connected to the joint portion 16. The arm 12 may be composed of, for example, 4-axis vertical articulated arm or 3-axis orthogonal arm. The arm 12 may be a mechanism for moving the robot hand 11 to a desired position by a configuration other than the vertical articulated arm and the orthogonal arm. Although not shown, the arm 12 includes a sensor or the like that detects the angle formed by the arm member 15 at each joint portion 16.

Although not shown, the picking robot 10 further includes sensors installed in the vicinity of the transport source S1 and the transport destination S2. The sensor is composed of, for example, an RGB-D sensor, a camera, a contact sensor, a distance sensor, and the like. The sensor acquires, for example, information about the holding object P placed in the transport source S1, information about the status of the transport source S1 or the transport destination S2, and the like.

The controller 13 manages and controls each unit of the picking robot 10. The controller 13 acquires various information detected by the sensor and controls the position and operation of the robot hand 11 based on the acquired information. The controller 13 is composed of a microcomputer including a processor such as a CPU (Central Processing Unit). The controller 13 is realized by a processor such as a CPU executing a program stored in a memory or an auxiliary storage device. At least a part of the controller 13 may be realized by hardware such as LSI (LargeScale Integration), ASIC (Application Specific Integrated Circuit), FPGA (Field-Programmable Gate Array), or may be realized by collaboration between software and hardware. As described above, the controller 13 has an image processing controller that processes the recognition result and the like, and a recognition system device such as a camera is linked under the image processing controller. Further, the planning controller is composed of a controller that controls the arm 12 and a controller that controls the robot hand 11.

Hereinafter, the robot hand 11 will be described.

Figure 2:
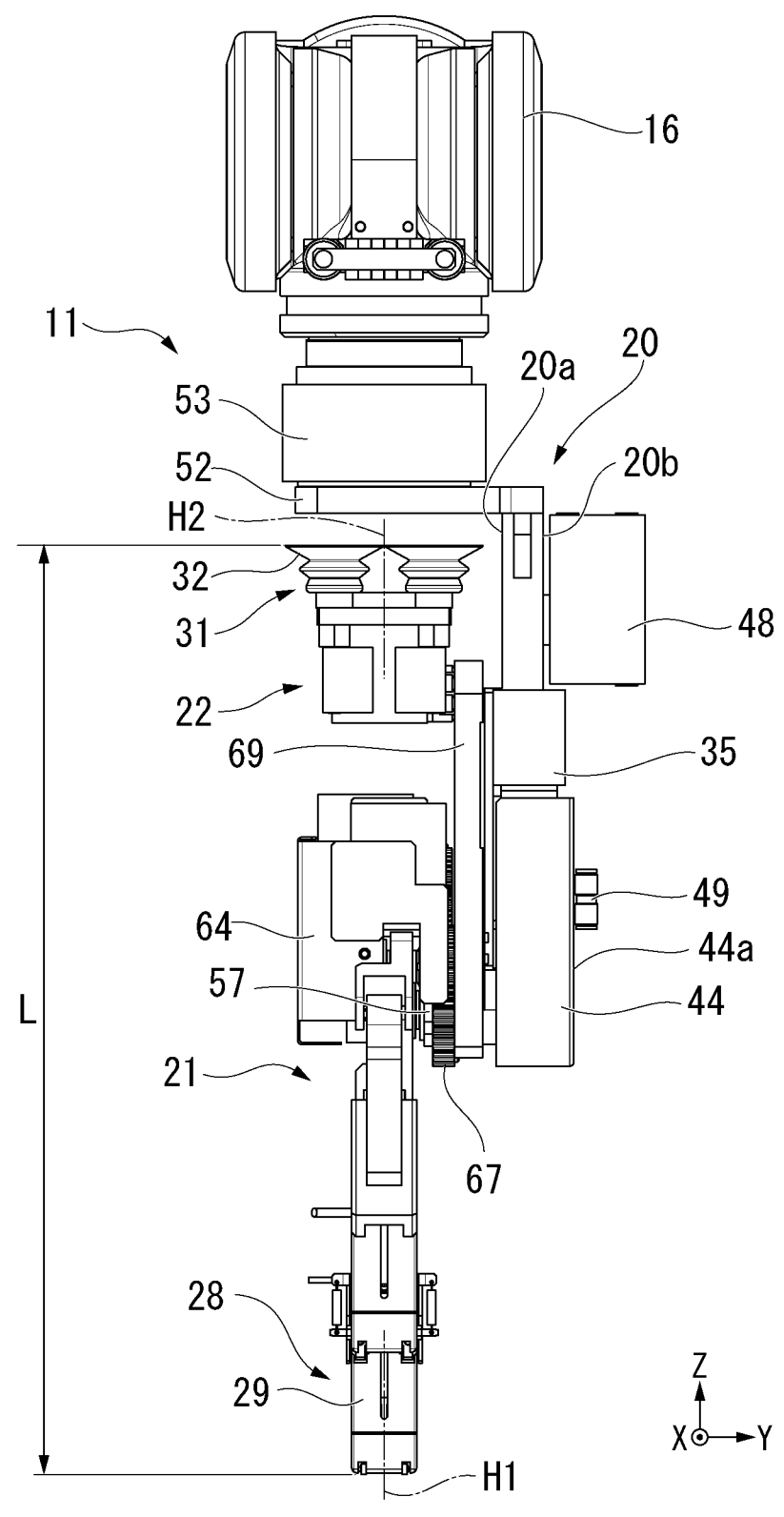
FIG. 2 is a side view of a robot hand of the embodiment.
Figure 3:
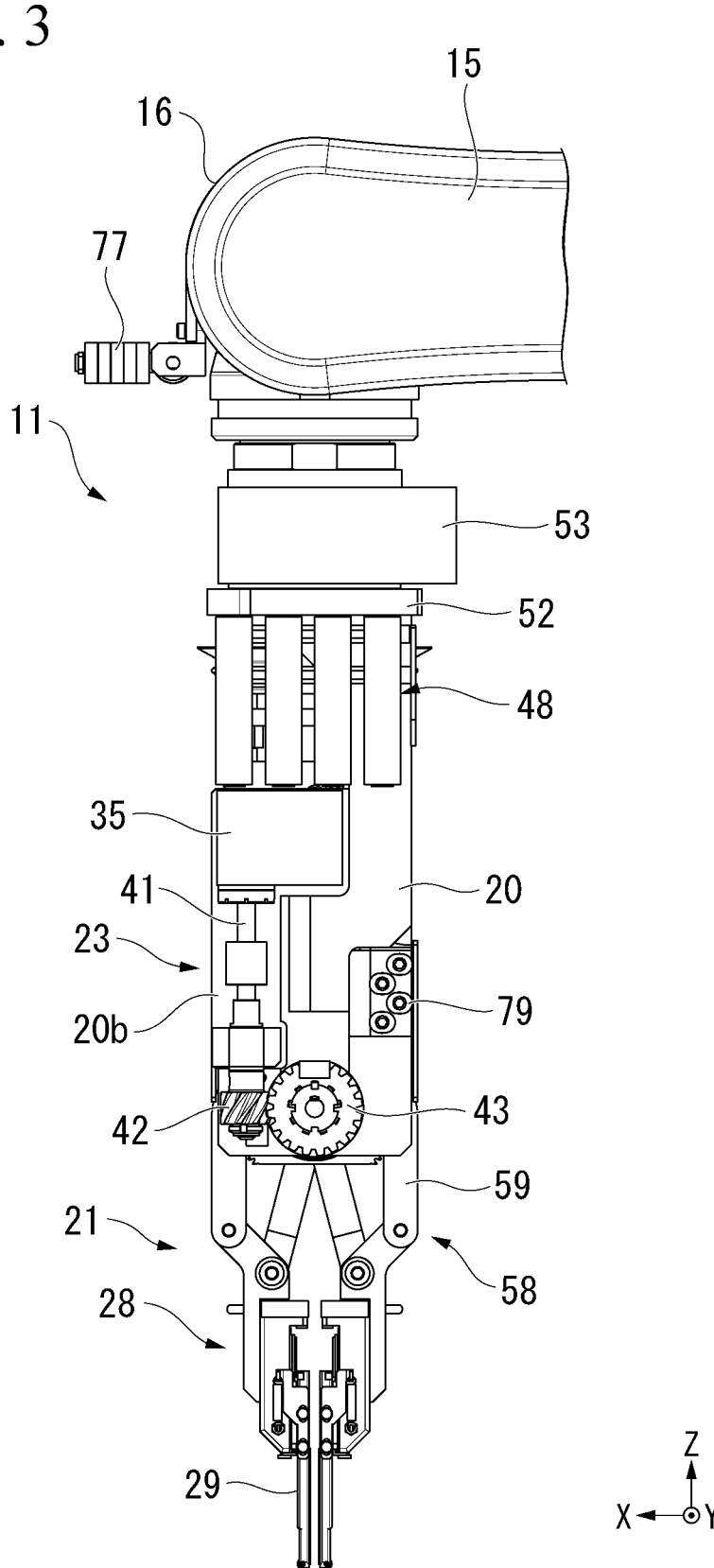
FIG. 3 is a front view of the robot hand of the embodiment.

FIG. 2 is a side view of the robot hand 11 as viewed from the +X direction. FIG. 3 is a front view of the robot hand 11 as viewed from the +Y direction. In the present specification, a view of each device viewed from the +X direction is referred to as a side view, and a view of each device viewed from the +Y direction is referred to as a front view.

Figure 4:
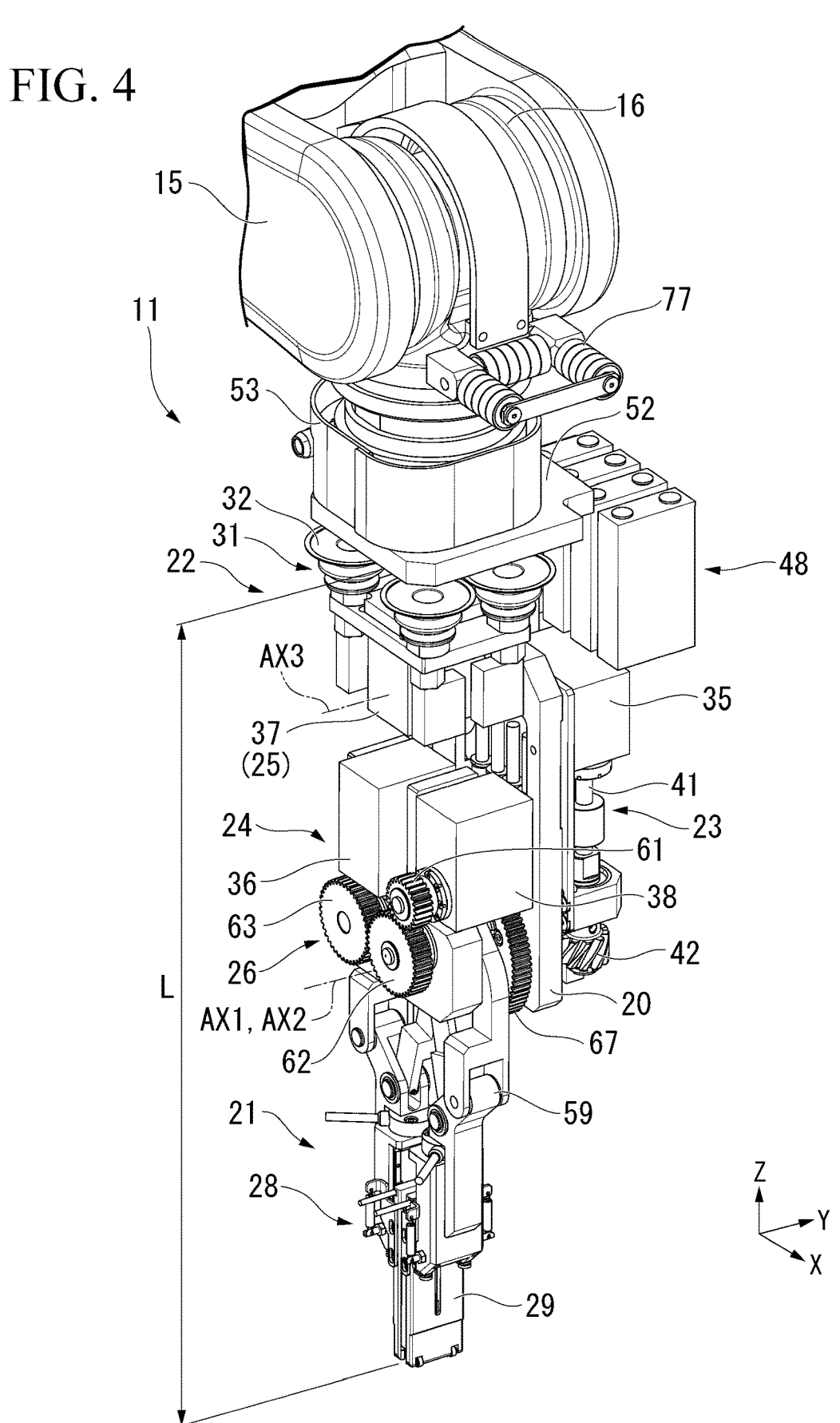
FIG. 4 is a perspective view showing positions of a plurality of motors in the robot hand.
Figure 5:
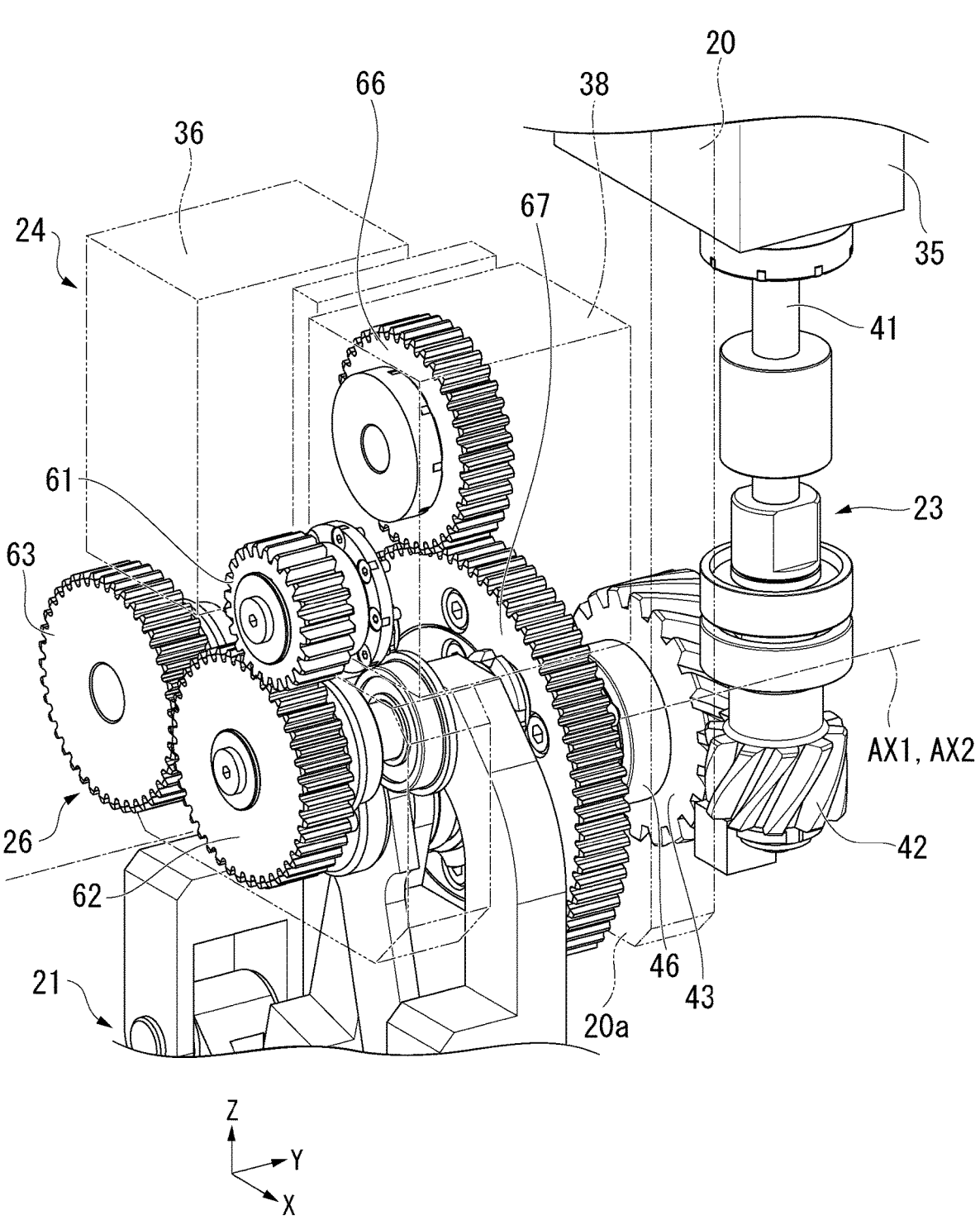
FIG. 5 is a perspective view showing an interrelationship of gears constituting a plurality of rotational drive mechanisms.

As shown in FIG. 2, the robot hand 11 has a base plate 20, a holding unit 21, and a suction unit 22. Further, here, the robot hand 11 includes a first rotation drive mechanism 23, a second rotation drive mechanism 24, a third rotation drive mechanism 25, and a fourth rotation drive mechanism 26, which are shown in FIGS. 3 to 5 described later. The rotation drive mechanisms 23, 24, 25, and 26 will be described in detail later with reference to other drawings such as FIGS. 3 to 5.

The base plate 20 of this embodiment corresponds to a support member within the scope of claims. The holding unit 21 of the present embodiment corresponds to a first holding unit within the scope of claims. The suction unit 22 of the present embodiment corresponds to a second holding unit within the scope of claims.

The base plate 20 is made of a plate-shaped member. The base plate 20 has a first surface 20a and a second surface 20b opposite to the first surface 20a. The base plate 20 supports the holding unit 21 and the suction unit 22. The holding unit 21 and the suction unit 22 face the first surface 20a of the base plate 20 and are arranged side by side in the Y-axis direction. The base plate 20 is arranged only on one side of the holding unit 21 and the suction unit 22, and is not arranged on the other side. That is, the holding unit 21 and the suction unit 22 are not sandwiched by the base plate 20 from both sides, but are supported by a cantilever structure with respect to the base plate 20.

The suction unit 22 is arranged so as to face the first surface 20a of the base plate 20. The holding unit 21 is arranged on the side opposite to the side where the base plate 20 is located with respect to the suction unit 22. That is, these two units 21 and 22 are arranged in the order of the suction unit 22 and the holding unit 21 from the first surface 20a side of the base plate 20. At least a part of the base plate 20, at least a part of the suction unit 22, and at least a part of the holding unit 21, which intersect with the first surface 20a when viewed from the normal direction (Y-axis direction) of the first surface 20a, are placed so that they overlap each other. In the following description, the direction in which the base plate 20, the suction unit 22, and the holding unit 21 overlap (Y-axis direction) is referred to as the thickness direction of the robot hand 11.

The holding unit 21 has a holding portion 28, and holds the holding object P from the side by using a holding claw 29 (holding part) described later. The holding unit 21 is rotatably supported in a plane (in the XZ plane) parallel to the first surface 20a with respect to the base plate 20.

The holding portion 28 of the present embodiment corresponds to the first holding portion within the scope of the claims.

The suction unit 22 has a suction portion 31, and holds the holding object Pin a form of negative pressure suction by using a suction pad 32 described later. The suction unit 22 is rotatably supported in a plane (in the XZ plane) parallel to the first surface 20a with respect to the base plate 20.

The suction portion 31 of the present embodiment corresponds to a second holding unit within the scope of claims.

As shown in FIG. 2, an ejector 48 and a piping guide 49 are arranged on the second surface 20b of the base plate 20. The ejector 48 uses compressed air to generate a negative pressure that acts as a suction force for the suction pad 32. The piping guide 49 guides the position of the negative pressure supply piping 50, which will be described later, on one surface 44a of the base plate cover 44. In FIG. 2, the negative pressure supply pipe 50 is not shown.

Hereinafter, the outline of the rotation drive mechanism included in the robot hand 11 will be described.

The robot hand 11 has a function of switching which of the holding unit 21 and the suction unit 22 to be used for holding the holding object P according to the holding object P, a function of changing the orientation of the holding unit 21, a function of changing the orientation of the suction portion 31, and a function of opening and closing the holding claw 29. In order to realize these functions, the robot hand 11 includes, as the rotation drive mechanism, a first rotation drive mechanism 23, a second rotation drive mechanism 24, a third rotation drive mechanism 25, a fourth rotation drive mechanism 26, and the like.

The first rotation drive mechanism 23 shown in FIGS. 3 and 4 is used both when switching between the holding unit 21 and the suction unit 22 to be used, and when changing the orientation of the holding unit 21. The second rotation drive mechanism 24 shown in FIG. 4 is used to correct the orientation change of the suction unit 22 due to the orientation change of the holding unit 21. The third rotation drive mechanism 25 shown in FIG. 4 is used when changing the orientation of the suction portion 31. The fourth rotation drive mechanism 26 is used when opening and closing the holding claw 29 constituting the holding portion 28.

Hereinafter, in order to make the explanation easier to understand, the first rotation drive mechanism 23 is referred to as a unit switching and holding orientation change mechanism 23, the second rotation drive mechanism 24 is referred to as a suction unit orientation correction mechanism 24, the third rotation drive mechanism 25 is referred to as a suction orientation changing mechanism 25, and the fourth rotation drive mechanism 26 is referred to as a holding claw opening/ closing mechanism 26.

The installation positions of the motors constituting each rotary drive mechanism will be described first.

FIG. 4 is a perspective view showing the positions of the plurality of motors.

As shown in FIG. 4, the first motor 35 constituting the unit switching/holding orientation changing mechanism 23 is installed on the base plate 20. The second motor 36 constituting the suction unit orientation correction mechanism 24 is installed in the holding unit 21. The third motor 37 constituting the suction orientation changing mechanism 25 is installed in the suction unit 22. The fourth motor 38 constituting the holding claw opening/closing mechanism 26 is installed in the holding unit 21. Each of the first motor 35, the second motor 36, the third motor 37, and the fourth motor 38 is composed of, for example, a servomotor.

Figure 6:
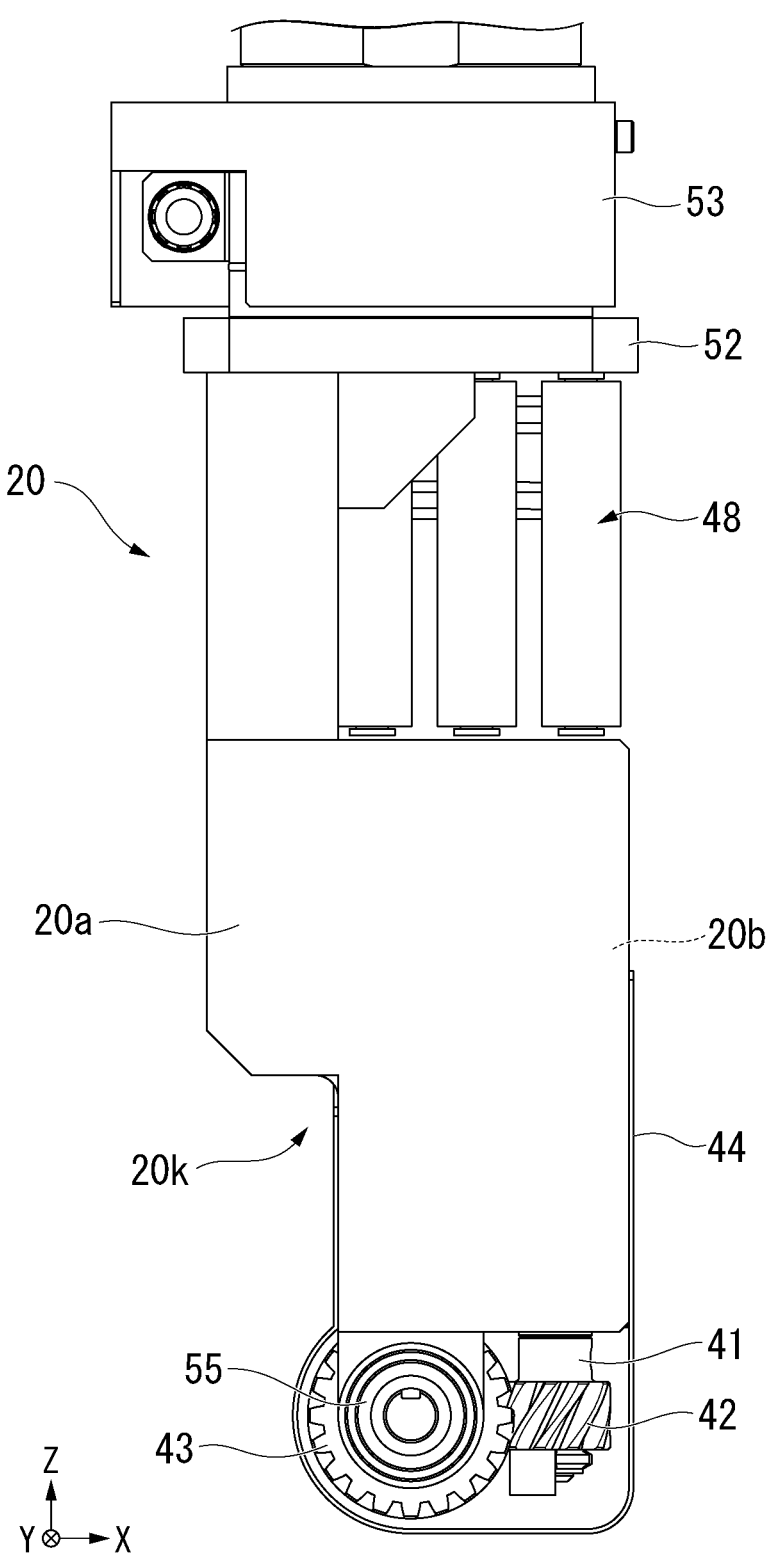
FIG. 6 is a front view of a base plate.

FIG. 6 is a front view showing the configuration of the base plate 20.

As shown in FIGS. 3 and 6, the second surface 20b of the base plate 20 has the first motor 35, the first shaft 41, the first gear 42, and the components of the unit switching/holding orientation changing mechanism 23. The second gear 43 is arranged. The first shaft 41 is connected to the first motor 35. The first shaft 41 extends downward (in the Z-axis direction) of the first motor 35. The first gear 42 is connected to the lower end of the first shaft 41. The first gear 42 is rotatable about the axis of the first shaft 41. The second gear 43 is arranged so as to mesh with the first gear 42. The second gear 43 converts the rotation of the first gear 42, which rotates about the Z axis, into the rotation about the Y axis. In the case of the present embodiment, the first gear 42 and the second gear 43 are composed of helical gears, but the type of gear is not particularly limited. The first shaft 41, the first gear 42, and the second gear 43 are covered with a base plate cover 44 (see FIG. 2).

FIG. 5 is a perspective view showing the interrelationship of various gears constituting the plurality of rotational drive mechanisms. In FIG. 5, in order to make it easier to see the positional relationship of the plurality of gears, the illustration of members other than the gears is omitted as appropriate.

As shown in FIG. 5, the second gear 43 is connected to the second shaft 46 fixed to the holding unit 21. As a result, when the first motor 35 rotates, the holding unit 21 rotates in the XZ plane via the first shaft 41, the first gear 42, the second gear 43, and the second shaft 46. Further, the axis of the second shaft 46 is the first rotation axis AX1 when the holding unit 21 and the suction unit 22 rotate integrally at the time of unit switching, and is the second rotation axis AX2 when the holding unit 21 changes its orientation. That is, the first rotation axis AX1 when the holding unit 21 and the suction unit 22 are switched and the second rotation axis AX2 when the orientation of the holding unit 21 is changed are arranged on a common axis.

As shown in FIG. 6, a top plate 52 is provided on the upper portion of the base plate 20. A force sensor 53 is arranged on the upper surface of the top plate 52. The force sensor 53 detects the force received by each of the units 21 and 22 when the holding unit 21 or the suction unit 22 comes into contact with an arbitrary object. The detected value of the force sensor 53 is output to the controller 13 and used for controlling each part of the holding unit 21 or the suction unit 22.

On the first surface 20a of the base plate 20, the bearing 55 is arranged at a position corresponding to the second gear 43 arranged on the second surface 20b. The bearing 55 smoothly rotates the suction unit 22 with respect to the base plate 20.

Figure 7:
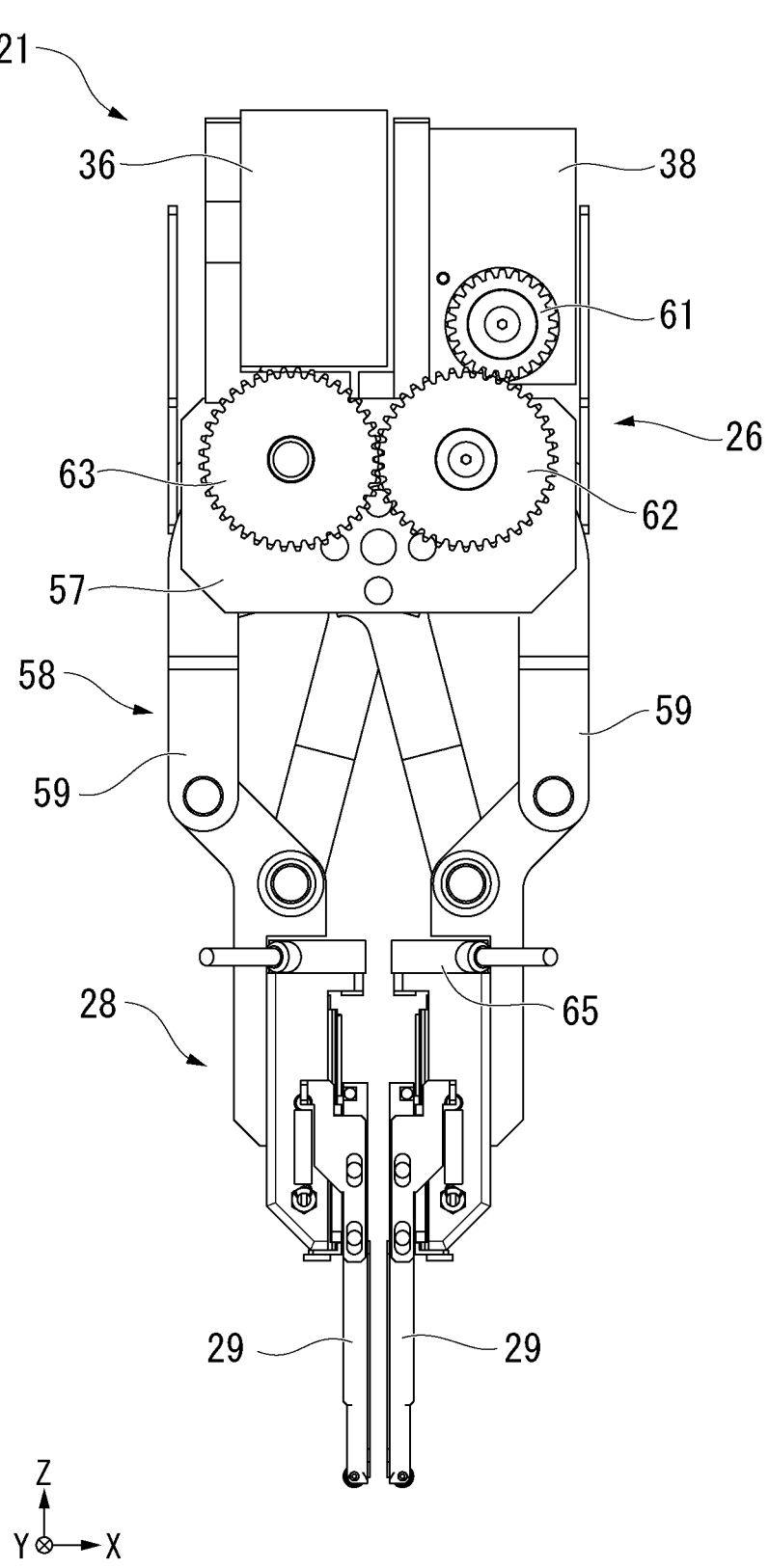
FIG. 7 is a front view of a holding unit.

FIG. 7 is a front view showing the configuration of the holding unit 21.

As shown in FIG. 7, the holding unit 21 includes a holding unit base material 57, a holding portion 28, a holding claw opening/closing mechanism 26, and a second motor 36. The holding portion 28 includes a link portion 58 and a plurality of holding claws 29. The holding unit 21 holds the holding object P in a state of being held by the plurality of holding claws 29. The second motor 36 is a component of the suction unit orientation correction mechanism 24.

The holding unit base material 57 supports each member such as the link portion 58, the holding claw opening/closing mechanism 26, and the second motor 36. The holding portion 28 of the present embodiment includes two holding claws 29 connected to the link portion 58. The holding portion 28 may include three or more holding claws, and the number of holding claws is not particularly limited.

The link portion 58 is composed of two parallel links 59. Each of the two holding claws 29 is connected to each of the two parallel links 59. Due to the movement of the link portion 58, the two holding claws 29 open and close by moving in the direction that increase the distance from each other in the X-axis direction while rising in the +Z direction and moving in the direction that narrows the distance from each other in the X-axis direction while descending in the −Z direction.

The holding claw opening/closing mechanism 26 includes a fourth motor 38, a third gear 61, a fourth gear 62, and a fifth gear 63. The third gear 61 is connected to the fourth motor 38. The fourth gear 62 meshes with the third gear 61. The fifth gear 63 meshes with the fourth gear 62. When the third gear 61 is rotated by the drive of the fourth motor 38, the fourth gear 62 and the fifth gear 63 rotate in opposite directions in the XZ plane. The two holding claws 29 perform either an opening operation or a closing operation depending on which direction the fourth gear 62 and the fifth gear 63 rotate. The holding claw opening/closing mechanism 26 is covered with a holding unit cover 64 (see FIG. 2).

A displacement sensor 65 is arranged above the holding claw 29. The displacement sensor 65 detects the force received by the holding claw 29 when the holding claw 29 comes into contact with an arbitrary object. The detected value of the holding claw 29 is output to the controller 13 and used for controlling the holding unit 21. In this way, in addition to the configuration in which the value of the displacement sensor 65 is directly read into the controller 13, a configuration in which a controller dedicated to hand control monitors the value of the displacement sensor 65 and determines contact with the item may be adopted.

The second motor 36 is arranged on the holding unit base material 57 in the −X direction with respect to the fourth motor 38. As shown in FIG. 5, the sixth gear 66 is arranged in the +Y direction with respect to the second motor 36. The sixth gear 66 is connected to the second motor 36. The sixth gear 66 meshes with the seventh gear 67, which will be described later, of the suction unit 22. The sixth gear 66 constitutes the suction unit orientation correction mechanism 24 together with the second motor 36.

Figure 8:
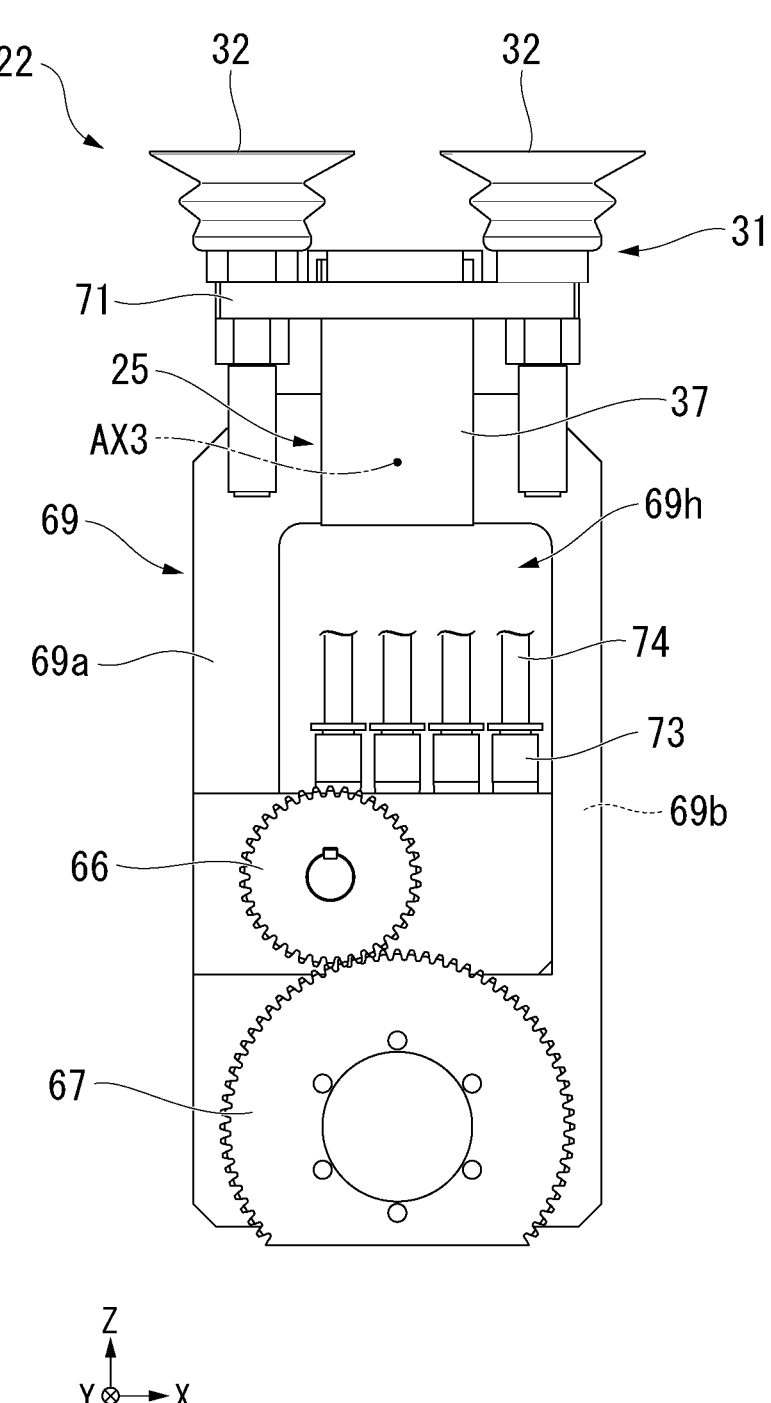
FIG. 8 is a front view of a suction unit.

FIG. 8 is a front view showing the configuration of the suction unit 22.

As shown in FIG. 8, the suction unit 22 includes a suction link portion 69, a suction portion 31, a suction orientation changing mechanism 25, and a seventh gear 67. The suction portion 31 includes a base 71 and a plurality of suction pads 32. The suction unit 22 holds the holding object P in a state of negative pressure suction by a plurality of suction pads 32.

The suction link portion 69 has a first surface 69a and a second surface 69b opposite to the first surface 69a. The second surface 69b of the suction link portion 69 faces the first surface 20a of the base plate 20. The suction link portion 69 has an opening 69h. The opening 69h is provided with a number of pipe joints 73 corresponding to the number of suction pads 32. The pipe joint 73 communicates with the negative pressure supply pipe 50, which will be described later. A relay pipe 74 is arranged in the space between the plurality of pipe joints 73 and the suction portion 31. A plurality of inlets 79, which will be described later, are provided on the second surface 69b of the suction link portion 69. A negative pressure flow path (not shown) is formed inside the suction link portion 69 to communicate the pipe joint 73 and the inlet 79.

The suction portion 31 includes four suction pads 32 arranged on a rectangular base 71. The suction pad 32 comes into contact with one surface of the holding object P and sucks the holding object P by a negative pressure. The four suction pads 32 are arranged in the vicinity of the four corners of the base 71. Therefore, the four suction pads 32 are arranged in a rectangular shape. The number of suction pads 32 does not have to be four, and is not particularly limited. The arrangement of the suction pads 32 does not have to be rectangular and is not particularly limited.

The suction orientation changing mechanism 25 has a fourth motor 38 arranged on the suction link portion 69. The suction portion 31 rotates in the XZ surface with respect to the suction link portion 69 as the fourth motor 38 rotates. The rotation axis of the fourth motor 38 is the third rotation axis AX3 when the orientation of the suction portion 31 is changed.

A seventh gear 67 is fixed to the first surface 69a of the suction link portion 69. The seventh gear 67 is arranged at the end of the first surface 69a of the suction link portion 69 on the side opposite to the side where the suction portion 31 is provided (in the −Z direction). As described above, the seventh gear 67 meshes with the sixth gear 66 connected to the 2nd motor 36 on the holding unit 21 to form the suction unit orientation correction mechanism 24.

As shown in FIG. 5, a second shaft 46 fixed to the holding unit 21 is inserted inside the seventh gear 67. A bearing 55 (see FIG. 6) is arranged between the second shaft 46 and the suction unit 22.

As shown in FIG. 2, the base plate 20, the suction unit 22, and the holding unit 21 overlap each other in the thickness direction of the robot hand 11. Therefore, the position of the suction link portion 69 and the position of the holding unit base material 57 in the thickness direction (Y-axis direction) of the robot hand 11 are different from each other. That is, the suction link portion 69 is located in the +Y direction with respect to the holding unit base material 57. Further, the suction portion 31 is arranged in the −Y direction with respect to the suction link portion 69.

With the above configuration, the first holding of the holding unit 21 is in a state where the holding portion 28 and the suction portion 31 are oriented 180° differently from each other in the plane parallel to the first surface 20a of the base plate 20 (in the XZ plane). The center line H1 and the second holding center line H2 of the suction unit 22 are arranged on the same straight line parallel to the Z-axis direction. The first holding center line H1 is defined as a straight line parallel to the Z axis, and a straight line passing through the center of the two holding claws 29 of the holding unit 21 in the opening/closing direction (X-axis direction) and the center of one holding claw 29 in the width direction (Y-axis direction). The second holding center line H2 is defined as a straight line parallel to the Z-axis and passing through the center of a rectangle in which the four suction pads 32 of the suction unit 22 viewed from the Z-axis direction are arranged. Hereinafter, the distance between the tip of the holding claw 29 and the suction surface of the suction pad 32 when the holding portion 28 and the suction portion 31 face different directions by 180° is defined as the length L of the robot hand 11.

Hereinafter, a route for supplying a negative pressure to the suction pad 32 will be described.

Figure 9:
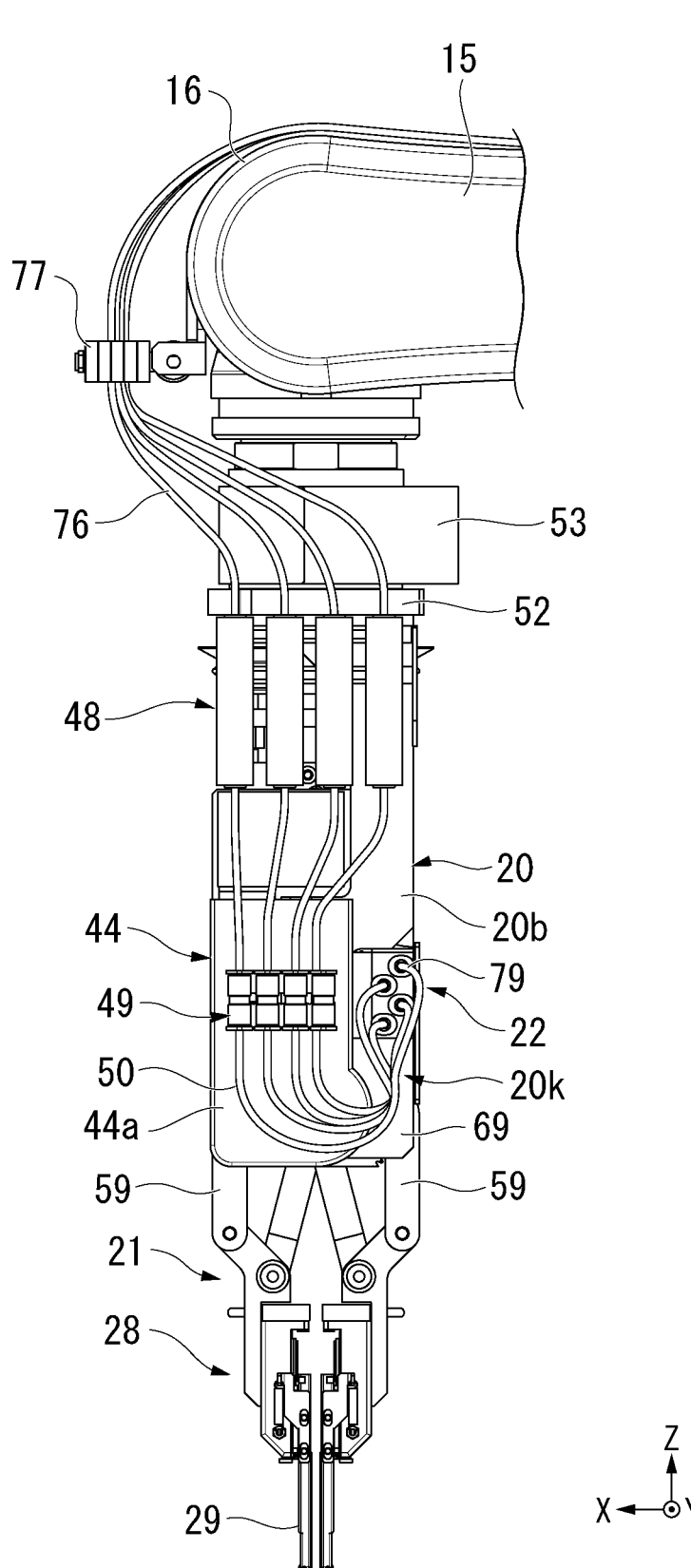
FIG. 9 is a diagram showing an arrangement of negative pressure supply pipes.

FIG. 9 is a diagram showing the arrangement of the negative pressure supply pipe 50.

As shown in FIG. 9, a plurality of compressed air introduction pipes 76 and a plurality of negative pressure supply pipes 50 are connected to the ejector 48. The compressed air introduction pipe 76 is arranged along the arm member 15 and the joint portion 16, and is branched into a plurality of pipes in a state where the position is regulated by the guide roller 77, and each of them is connected to the ejector 48. The number of the compressed air introduction pipes 76 and the negative pressure supply pipes 50 corresponds to the number of the suction pads 32. In the case of this embodiment, the number of the compressed air introduction pipes 76 and the number of the negative pressure supply pipes 50 are both four.

The plurality of negative pressure supply pipes 50 extend downward (−Z direction) along one surface 44a of the base plate cover 44 by the piping guide 49, and are curved and extend upward (+Z direction). The lower end of the curved portion of the plurality of negative pressure supply pipes 50 is arranged at a position equivalent to the lower end of the base plate cover 44 or a position higher than the lower end of the base plate cover 44. The compressed air introduction pipe 76 and the negative pressure supply pipe 50 are composed of, for example, a spirally wound resin spiral tube. As a result, the compressed air introduction pipe 76 and the negative pressure supply pipe 50 can be expanded and contracted according to the operation of each part. The compressed air introduction pipe 76 and the negative pressure supply pipe 50 may be composed of tubes of other forms.

As shown in FIG. 6, in the lower part of the base plate 20, a cutout portion 20k having a rectangular cutout at a corner is formed on a side opposite to the side where the first gear 42 is provided in the X-axis direction. Therefore, the width of the lower part of the base plate 20 is narrower than the width of the upper part of the base plate 20. On the other hand, as shown in FIG. 8, the suction link portion 69 is formed to have the same width in the vertical direction. As a result, as shown in FIG. 9, a part of the suction link portion 69 is exposed from the base plate 20 in a state where the suction unit 22 and the base plate 20 are overlapped when viewed from the +Y direction. A plurality of inlets 79 are provided in a region of the suction link portion 69 that is exposed to the outside from the cutout portion 20k of the base plate 20. The negative pressure supply pipe 50 is connected to the inlet 79.

FIG. 9 shows a state in which the holding unit 21 is used and the suction unit 22 is not used, and the suction unit 22 is in an orientation in which the suction portion 31 faces upward (+Z side) in the vertical direction. In this orientation, the negative pressure supply pipe 50 is wound counterclockwise from the pipe guide 49 side toward the inlet 79 side and is connected to the inlet 79. Therefore, it is necessary to rotate the suction unit 22 clockwise when the unit is switched. As a result, the negative pressure supply pipe 50 can be deformed without any problem from the bent state to the extended state. That is, the negative pressure supply pipe 50 is arranged so as to wind from the inlet 79 side to the suction pad 32 side in the direction opposite to the direction in which the suction unit 22 rotates.

In the above configuration, the compressed air introduced from the compressed air introduction pipe 76 is converted into negative pressure air by the ejector 48. The negative pressure air is supplied to the inlet 79 via the negative pressure supply pipe 50, and is supplied to the pipe joint 73 via the negative pressure flow path formed inside the suction link portion 69.

Although not shown in FIG. 9, in addition to the negative pressure supply pipe 50, the electrical wiring for transmitting signals to each motor is also routed on the second surface 20b side of the base plate 20 as in the negative pressure supply pipe 50.

Figure 10:
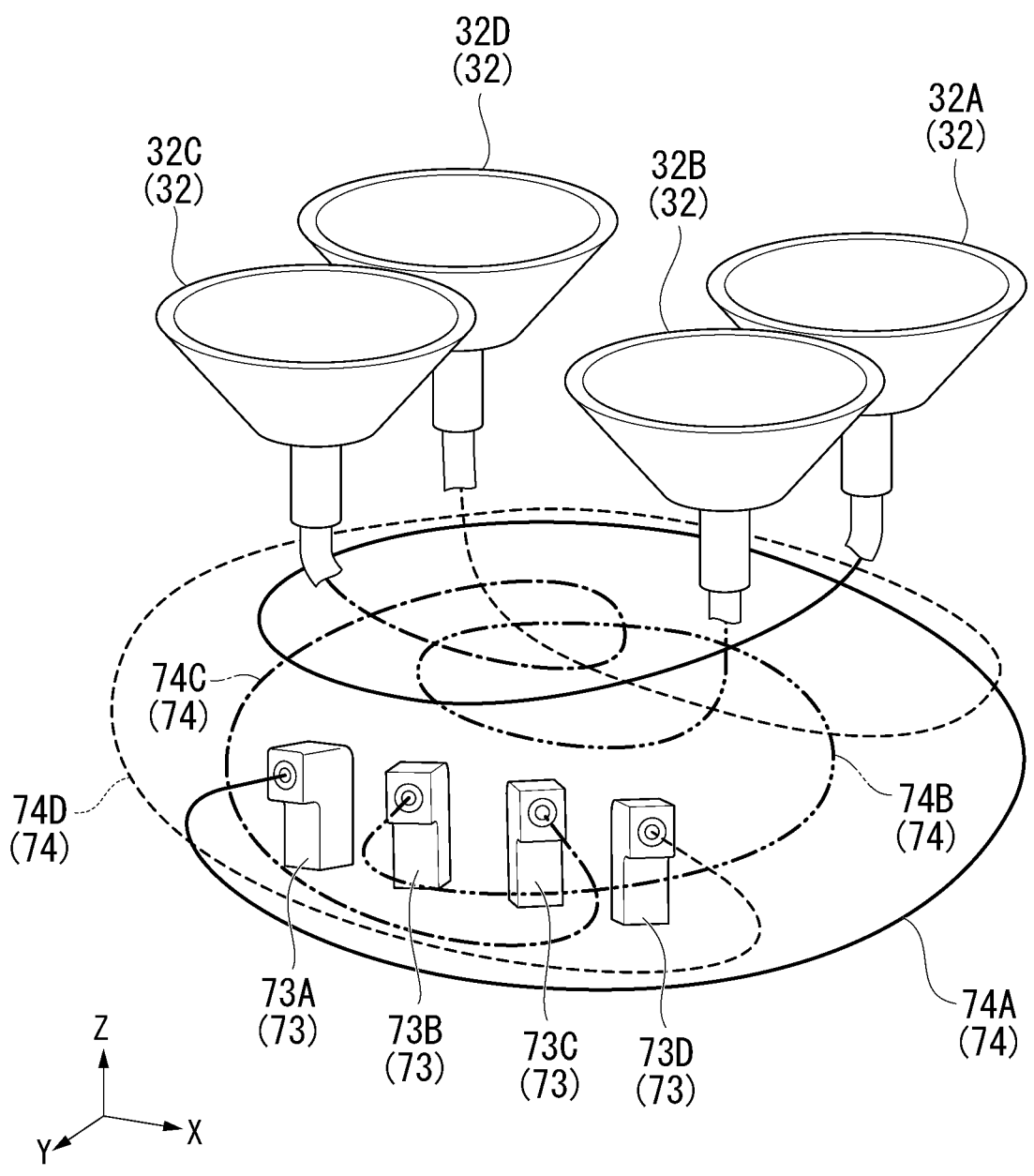
FIG. 10 is a diagram showing an arrangement of relay pipes.

FIG. 10 is a schematic diagram explaining the arrangement of the relay pipe 74. In FIG. 10, only the relay pipe 74, the suction pad 32, and the pipe joint 73 are shown in order to make it easier to see the arrangement of the relay pipe 74.

As shown in FIG. 10, a plurality of relay pipes 74 are provided in the space between the plurality of suction pads 32 and the plurality of pipe joints 73. The relay pipe 74 connects the suction pad 32 and the pipe joint 73. The relay pipe 74 transports the negative pressure air supplied from the negative pressure flow path of the suction link portion 69 to the suction pad 32. The relay pipe 74 is spirally arranged in the space between the suction pad 32 and the pipe joint 73. In the present embodiment, the entire relay pipe 74 is arranged in a spiral shape, but a part of the relay pipe may extend linearly.

In FIG. 10, among a plurality of suction pads 32 arranged on the XY plane, the suction pad 32 located on the +X and −Y sides is designated as a first suction pad 32A, the suction pad 32 located on the +X and +Y sides is designated as a second suction pad 32B, the suction pad 32 located on the −X, +Y sides is referred to as a third suction pad 32C, and the suction pad 32 located on the −X, −Y side is referred to as a fourth suction pad 32D. The plurality of pipe joints 73 arranged in the X-axis direction are referred to as a first pipe joint 73A, a second pipe joint 73B, a third pipe joint 73C, and a fourth pipe joint 73D in order from the −X side to the +X side. The row in which the plurality of pipe joints 73 are lined up is closer to the row in which the second suction pad 32B and the third suction pad 32C are lined up than in the row in which the first suction pad 32A and the fourth suction pad 32D are lined up.

Among the first suction pad 32A and the second suction pad 32B located on the +X side, the first suction pad 32A, which has a relatively long distance to the row in which a plurality of pipe joints 73 are lined up passes, is connected to the first pipe joint 73A via the first relay pipe 74A. The second suction pad 32B, which has a relatively short distance to the row in which the plurality of pipe joints 73 are lined up, is connected to the second pipe joint 73B via the second relay pipe 74B. When viewed from the +Z direction, the first relay pipe 74A is wound clockwise with a large diameter. The second relay pipe 74B is wound clockwise with a diameter smaller than that of the first relay pipe 74A.

Among the third suction pad 32C and the fourth suction pad 32D located on the −X side, the third suction pad 32C, which has a relatively short distance to the row in which a plurality of pipe joints 73 are lined up, is connected to the third pipe joint 73C via the third relay pipe 74C. The fourth suction pad 32D, which has a relatively long distance to the row in which the plurality of pipe joints 73 are lined up, is connected to the fourth pipe joint 73D via the fourth relay pipe 74D. When viewed from the +Z direction, the fourth relay pipe 74D is wound counterclockwise with a large diameter. The third relay pipe 74C is wound counterclockwise with a diameter smaller than that of the fourth relay pipe 74D.

That is, among the two suction pads 32 located at the same position in the X-axis direction, the relay pipe 74 connected to the suction pad 32 located at a position relatively far from the row in which the plurality of pipe joints 73 are lined up is wound around a large circle. The relay pipe 74 connected to the suction pad 32 located at a position relatively close to the row in which the plurality of pipe joints 73 are lined up is wound in a small circle. Further, the relay pipe 74 connected to the two suction pads 32 located on the +X side and the relay pipe 74 connected to the two suction pads 32 located on the −X side are wound in opposite directions with each other.

Hereinafter, the operation of the robot hand 11 will be described.

First, an operation when switching which unit of the holding unit 21 and the suction unit 22 is used will be described.

Figure 11:
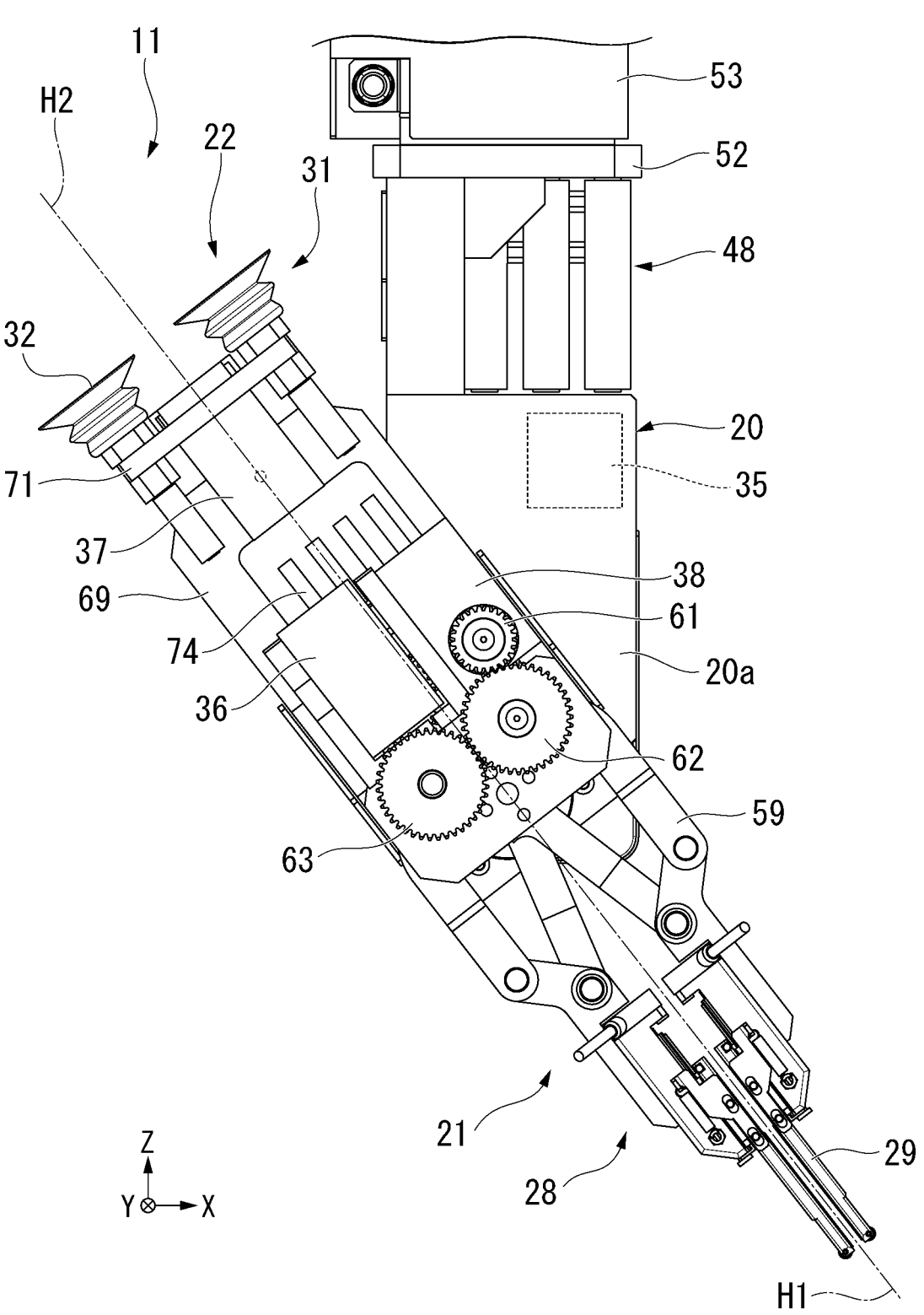
FIG. 11 is a diagram showing an operation of the robot hand when switching units.

FIG. 11 is a diagram showing the operation of the robot hand 11 when the units are switched.

As shown in FIG. 11, when the units are switched, the holding unit 21 and the suction unit 22 rotates integrally in the plane parallel to the first surface 20a of the base plate 20 (in the XZ plane) while maintaining the orientations in which the holding portion 28 and the suction portion 31 face different directions by 180°. At this time, the first holding center line H1 of the holding unit 21 and the second holding center line H2 of the suction unit 22 are arranged on the same straight line.

At the time of unit switching, the controller 13 controls the first motor 35 to the position control state, the second motor 36 to the servo lock state, the third motor 37 to the servo lock state, and the fourth motor 38 to the servo lock state. The position control state is a state in which the rotation of each motor is controlled so as to position a moving object such as a holding unit 21 at a predetermined position by a position command signal. The servo lock state is a state in which the stop position is maintained even if a force acts in the direction in which the motor rotates due to, for example, an external force.

When the first motor 35 rotates, as shown in FIG. 5, the holding unit 21 rotates in a plane (XZ plane) parallel to the first surface 20a of the base plate 20 via the first shaft 41, the first gear 42, the second gear 43, and the second shaft 46. At this time, the second motor 36 is in the servo-locked state, and the stopped state is maintained. Therefore, the sixth gear 66 connected to the second motor 36 on the holding unit 21 is stationary in a state of being meshed with the seventh gear

67 of the suction unit 22. Therefore, the positional relationship between the sixth gear 66 and the seventh gear 67, that is, the positional relationship between the holding unit 21 and the suction unit 22 does not change. As a result, the suction unit 22 is integrated with the holding unit 21 and rotates in a plane (XZ plane) parallel to the first surface 20a of the base plate 20, while maintaining an orientation facing the holding unit 21 in different directions by 180°.

Since the first motor 35 is in the position control state, for example, when the holding unit 21 is used, the controller 13 stops the rotation of the first motor 35 at a position where the first holding center line H1 of the holding unit 21 faces downward in the vertical direction and the second holding center line H2 of the suction unit 22 faces upward in the vertical direction with respect to the rotation of the first motor 35. Next, when the suction unit 22 is used, the controller 13 may stop the rotation of the first motor 35 at a position where the holding unit 21 and the suction unit 22 are integrally rotated by 180° until the second holding center line H2 of the suction unit 22 faces downward in the vertical direction and the first holding center line H1 of the holding unit 21 faces upward in the vertical direction.

When the holding unit 21 and the suction unit 22 are integrally rotated at the time of unit switching, the third motor 37 is in the servo-locked state. Therefore, as shown in FIG. 11, the orientation of the suction portion 31 is adjusted to the suction link portion 69. On the other hand, the state of not tilting is maintained. Further, since the fourth motor 38 is in the servo-locked state, the two holding claws 29 are maintained in the closed state.

Next, the operation when changing the orientation of the holding unit 21 will be described.

Figure 12:
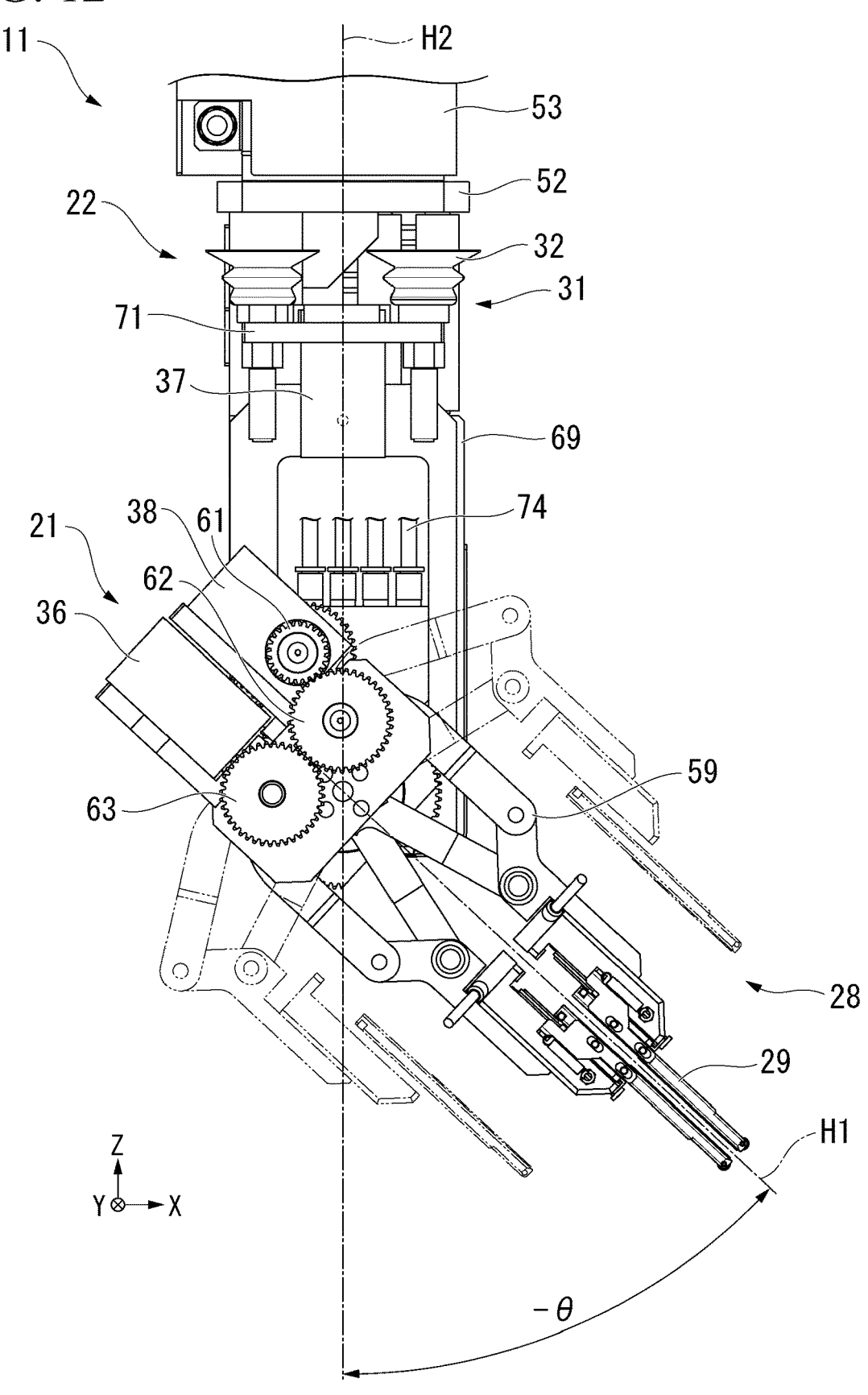
FIG. 12 is a diagram showing the operation of the robot hand when an orientation of the holding unit is changed.

FIG. 12 is a diagram explaining the operation of the robot hand 11 when the orientation of the holding unit 21 is changed.

When the orientation of the holding unit 21 is changed, the controller 13 controls the first motor 35 in the position control state, the second motor 36 in the position control state, the third motor 37 in the servo lock state, and the fourth motor 38 in the servo lock state or position.

As described above, the holding unit 21 is rotated by the first motor 35. Therefore, the orientation of the holding unit 21 can be changed by rotating the holding unit 21 by the first motor 35 so that the first holding center line H1 faces, for example, the range of −90° to +90°, with the orientation in which the first holding center line H1 faces downward in the vertical direction is set to 0°. However, if the second motor 36 is controlled to the servo-locked state as in the case of the unit switching described above, the orientation of the suction unit 22 also changes as the orientation of the holding unit 21 changes.

Therefore, in the case of the present embodiment, the controller 13 controls to correct the orientation of the suction unit 22 as follows so that the orientation of the suction unit 22 does not change with the change of the orientation of the holding unit 21. Specifically, assuming that the clockwise direction in FIG. 12 is a positive angle and the counterclockwise direction is a negative angle, the holding unit 21 is rotated so that the first holding center line H1 faces the direction of −θ, and the suction unit 22 is rotated by +θ. As a result, the suction unit 22 is maintained in a state in which the suction portion 31 faces upward in the vertical direction without changing its orientation. That is, the suction unit 22 is rotated with respect to the base plate 20 in a direction that cancels the change in the orientation of the suction unit 22 due to the change in the orientation of the holding unit 21.

When the holding unit 21 is rotated when the orientation of the holding unit 21 is changed, since the third motor 37 is in the servo-locked state, the orientation of the suction portion 31 is maintained in a state of not being tilted with respect to the suction link portion 69.

When the fourth motor 38 is in the servo-locked state, the holding unit 21 changes its orientation while maintaining the two holding claws 29 in the closed state. When the fourth motor 38 is in the position control state, the holding unit 21 changes its orientation with the two holding claws 29 opened to a predetermined position.

Next, the operation when changing the orientation of the suction unit 22 will be described.

Figure 13:
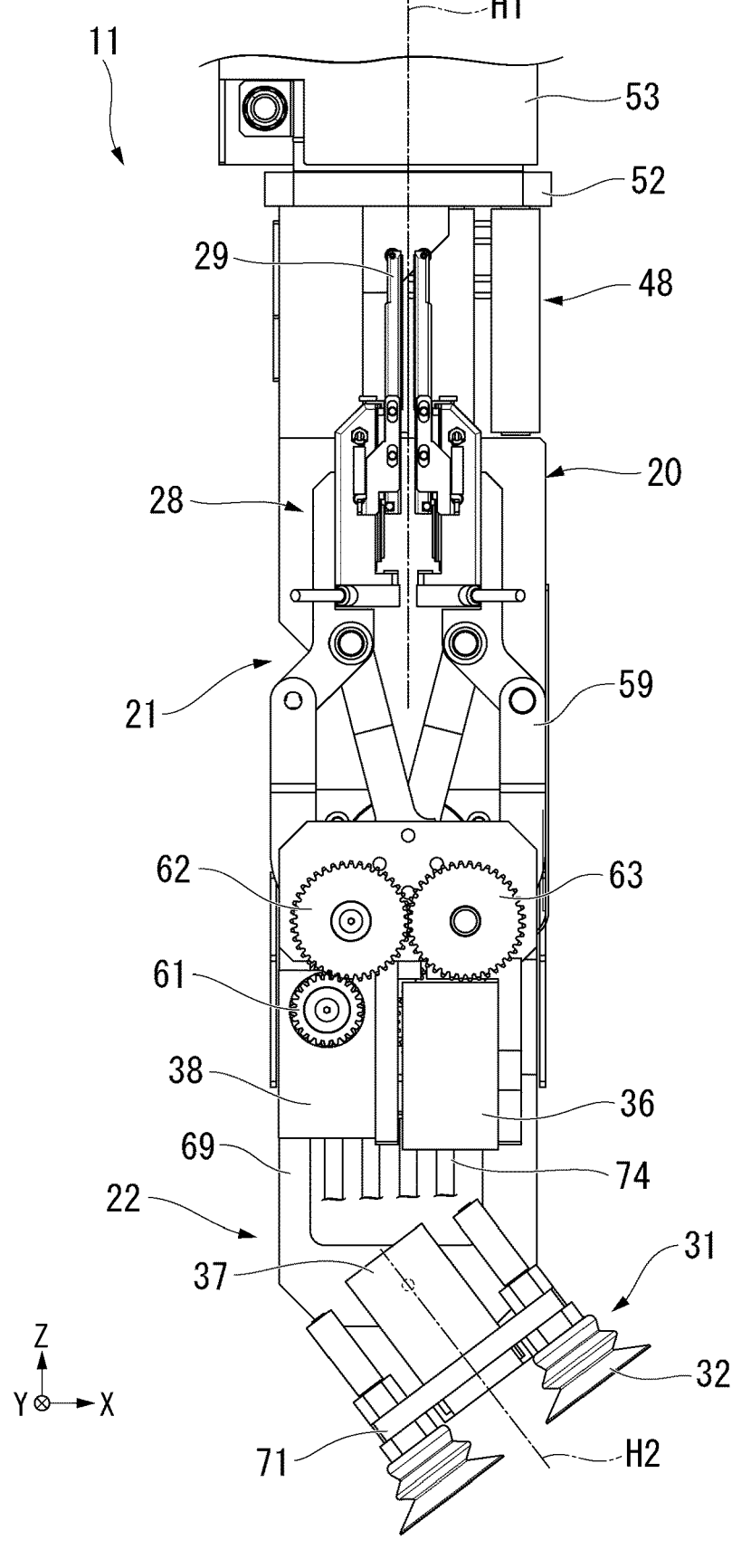
FIG. 13 is a diagram showing the operation of the robot hand when the orientation of the suction unit is changed.

FIG. 13 is a diagram explaining the operation of the robot hand 11 when the orientation of the suction unit 22 is changed.

When the orientation of the suction unit 22 is changed, the controller 13 controls the first motor 35 in the servo-locked state, the second motor 36 in the servo-locked state, the third motor 37 in the position control state, and the fourth motor 38 in the servo-locked state.

The suction portion 31 is rotated by the third motor 37. Therefore, the orientation of the suction portion 31 can be changed by rotating the suction portion 31 with respect to the suction link portion 69 by the third motor 37 so that the second holding center line H2 faces, for example, in the range of −90° to +90°, with the orientation in which the second holding center line H2 of the suction unit 22 faces downward in the vertical direction is 0°.

When the suction portion 31 is rotated when the orientation of the suction portion 31 is changed, the first motor 35 is in the servo-locked state. Therefore, the orientation of the holding unit 21 is maintained in a state in which the first holding center line H1 faces upward in the vertical direction and does not change. At this time, since the second motor 36 is in the servo-locked state, the orientation of the suction link portion 69 with respect to the base plate 20 is maintained in the unchanged state. The position of the suction link portion 69 with respect to the base plate 20 may be adjusted by setting the second motor 36 in the position controlled state. Further, since the fourth motor 38 is in the servo-locked state, the holding unit 21 maintains the state in which the two holding claws 29 are closed.

Hereinafter, the effects of the robot hand 11 and the picking robot 10 of the present embodiment will be described.

First, as the robot hand of the comparative example, it is assumed that the robot hand is provided with a holding unit and a suction unit, and each of the holding unit and the suction unit has an orientation changing function. In the robot hand of the comparative example, the first rotation axis for integrally rotating the holding unit and the suction unit when switching units, the second rotation axis for rotating the holding unit when the orientation of the holding unit is changed, and the third rotation axis for rotating the suction unit when the orientation of the suction unit is changed are arranged at different positions along the length direction of the robot hand. The first rotation axis is located between second rotation axis and the third rotation axis.

In the case of the robot hand of the comparative example, the length of the robot hand is the sum of the distance from the first rotation axis to the second rotation axis, the distance from the first rotation axis to the third rotation axis, the distance from the second rotation axis to the tip of the holding unit, and the distance from the third rotation axis to the tip of the suction unit. In the case of the robot hand of the comparative example, the length of the robot hand tends to be long. If the length of the robot hand is long, there is a problem in that it easily interferes with other obstacles when moving the robot hand.

In response to this problem, the robot hand 11 of the present embodiment includes a unit switching/holding orientation changing mechanism 23 that switches the unit by integrally rotating the holding unit 21 and the suction unit 22 with respect to the base plate 20, and changes the orientation of the holding unit 21 by rotating the holding unit 21 with respect to the base plate 20. The controller 13 switches which of the holding unit 21 and the suction unit 22 is used for holding the holding object, by rotating the holding unit 21 and the suction unit 22 in a state where the holding portion 28 and the suction portion 31 face different directions from each other, the sandwiching unit 21 and the suction unit 22 are rotated, and controls to change the orientation with respect to the base plate 20 by rotating at least one of the holding unit 21 and the suction unit 22 with respect to the base plate 20.

According to this configuration, the interference between the holding unit 21 and the suction unit 22 and the surrounding obstacles is suppressed, so that the robot hand 11 capable of widening the movable range can be realized.

Further, as shown in FIG. 5, the first rotation axis AX1 when the unit is switched and the second rotation axis AX2 when the orientation of the holding unit 21 is changed are arranged on a common axis in the length direction of the robot hand 11.

That is, in the robot hand of the comparative example, three rotation axes for realizing the three operations of unit switching, the orientation change of the holding unit, and the orientation change of the suction unit are arranged at three positions in the length direction of the robot hand. On the other hand, in the robot hand 11 of the present embodiment, the three rotation axes AX1, AX2, and AX3 for realizing the three operations of unit switching, orientation change of the holding unit, and orientation change of the suction unit are arranged at two positions in the length direction of the robot hand 11 as shown in FIG. 4.

As a result, in the case of the present embodiment, the length of the robot hand 11 is the sum of the distance from the first rotation axis AX1 and the second rotation axis AX2 to the third rotation axis AX3, the distance from the first rotation axis AX1 and the second rotation axis AX2 to the tip of the holding unit 21, and the distance from the third rotation axis AX3 to the tip of the suction unit 22. In this way, the length of the robot hand 11 of the present embodiment can be made shorter than the length of the robot hand of the comparative example.

According to the configuration of the present embodiment, the length of the robot hand 11 can be shortened, so that the risk of interference with obstacles when moving the robot hand 11 can be reduced. Further, according to the configuration of the present embodiment, the movable range of the robot hand 11 can be made wider than the movable range of the robot hand of the comparative example. Further, according to the configuration of the present embodiment, it is not necessary to simplify the configuration of each unit when the robot hand 11 is miniaturized, so that the functions of the holding unit 21 and the suction unit 22 can be fully exhibited.

Further, the robot hand 11 of the present embodiment integrally rotates the holding portion 28 and the suction portion 31 with respect to the base plate 20 in a state of facing different directions, and holds the holding object by either the holding unit 21 or the suction unit 22.

According to this configuration, it is possible to switch whether to hold the holding object by either the holding unit 21 or the suction unit 22 by a smooth operation.

When the rotation axis at the time of unit switching and the rotation axis at the time of changing the orientation of one of the two units are arranged on a common axis, instead of the configuration of the present embodiment, it is conceivable to arrange the first rotation axis at the time of unit switching and the third rotation axis when the orientation of the suction portion is changed on a common axis.

The robot hand 11 of the present embodiment employs an opening/closing structure of a holding claw 29 using a parallel link 59 as the holding unit 21. Therefore, the distance from the second rotation axis AX2 when the orientation of the holding unit 21 is changed to the tip of the holding unit 21 is larger than the distance from the third rotation axis AX3 when the orientation of the suction portion 31 is changed to the tip of the suction portion 31. As a result, when the first rotation axis AX1 and the second rotation axis AX2 are arranged on a common axis as in the present embodiment, the effect of shortening the length of the robot hand 11 is greater than the effect of arranging the first rotation axis AX1 and the third rotation axis AX3 on a common axis.

The robot hand 11 of the present embodiment includes a suction unit orientation correction mechanism 24 that corrects the orientation of the suction unit 22 by rotating the suction unit 22 in a direction that cancels the change in the orientation of the suction unit 22 due to the change in the orientation of the holding unit 21 when the orientation of the holding unit 21 is changed. According to this configuration, when the orientation of the holding unit 21 is changed, it is possible to suppress the change in the orientation of the suction unit 22 in conjunction with the change in the orientation of the holding unit 21. As a result, when the holding unit 21 is used in a state where the holding unit 21 is tilted, it is possible to prevent the suction unit 22 from changing its orientation and interfering with an obstacle.

In the robot hand 11 of the present embodiment, the holding unit 21 and the suction unit 22 are arranged so as to overlap the first surface 20a of the base plate 20.

As described above, according to the configuration in which the holding unit 21 and the suction unit 22 are supported by the base plate 20 by the cantilever structure, the thickness of the robot hand 11 can be reduced. Further, the projected area of the robot hand 11 as seen from the length direction (Z-axis direction) of the robot hand 11 can be reduced. As a result, interference of the robot hand 11 with obstacles can be suppressed, and the movable range can be widened. Another advantage of the cantilever structure is that, for example, when the robot hand 11 goes to pick up an article placed in the corner of the box, the robot hand 11 may be moved so that the side opposite to the side on which the base plate 20 is provided, that is, the holding unit 21 side, faces the inner surface of the box. As a result, the base plate 20 is less likely to interfere with the inner surface of the box, and the holding object P can be efficiently held.

In the robot hand 11 of the present embodiment, the first holding center line H1 of the holding unit 21 and the second holding center line H2 of the suction unit 22 are arranged on the same straight line, in an orientation in which the holding portion 28 and the suction portion 31 face directions 180 degrees different from each other.

According to this configuration, regardless of which of the holding unit 21 and the suction unit 22 is used, the coordinate system for controlling the position of the holding claw 29 or the suction pad 32 can be commonly used. As a result, the burden on the controller 13 related to the position control of the holding claw 29 or the suction pad 32 can be reduced.

Further, even if the holding portion 28 and the suction portion 31 are arranged on the same straight line and the holding portion 28 and the suction portion 31 are rotated 180 degrees to switch the functions, the tip position of one hand (for example, the holding portion 28) located before the rotation and the other hand (for example, the suction portion 31) located after the rotation are the same. That is, the holding portion 28 and the suction portion 31 are at positions symmetrical with each other. For example, if the total length of the hand is 500 mm and the first rotation axis AX1 at the time of unit switching is located 250 mm from the tip of one hand, even if the holding portion 28 and the suction portion 31 are rotated 180 degrees, the tip of the holding claw 29 or the tip of the suction pad 32 is always 500 mm ahead when viewed from the connection position between the arm 12 and the robot hand 11.

According to this configuration, the tip position of the robot hand 11 as seen from the arm 12 is the same both when it is held and when it is sucked, so it is possible to perform position control arithmetic processing without being aware of which function it currently has as a system. As a result, the load on the controller 13 can be reduced.

The robot hand 11 of the present embodiment further includes a suction orientation changing mechanism 25 that changes the orientation of the suction portion 31 in the suction unit 22 by rotating the suction portion 31.

According to this configuration, when the suction unit 22 is used, the suction pad 32 can be made to face one surface of the holding object P placed in various orientations and positions, and the holding object P can be reliably held.

In the robot hand 11 of the present embodiment, the suction unit 22 is arranged so as to face the first surface 20*a* of the base plate 20. The negative pressure supply pipe 50 for transporting the negative pressure to the suction pad 32 is connected to the inlet 79 arranged so as to face the second surface 20*b* of the base plate 20 and provided in a region of the suction unit 22 exposed to the outside from the notch 20*k* of the base plate 20. Further, the negative pressure supply pipe 50 is arranged so as to wind from the inlet 79 side to the suction pad 32 side in the direction opposite to the direction in which the suction unit 22 rotates.

According to this configuration, when the suction unit 22 rotates along the first surface 20*a* of the base plate 20, there is little risk that the negative pressure supply pipe 50 will be damaged by being sandwiched between the suction unit 22 and the base plate 20 or being pulled by an excessive force as the suction unit 22 rotates, and the reliability of the negative pressure supply pipe 50 can be improved.

In the robot hand 11 of the present embodiment, the relay pipe 74 that transports the negative pressure to the suction pad 32 is spirally arranged in the space between the pipe joint 73 and the suction pad 32.

Assuming that the relay pipe 74 is linearly arranged in the space between the pipe joint 73 and the suction pad 32, the relay pipe 74 may buckle when the orientation of the suction portion 31 changes. On the other hand, in the case of the present embodiment, since the relay pipe 74 is spirally wound, when the orientation of the suction portion 31 changes, the relay pipe 74 is deformed according to the orientation change of the suction portion 31 within the deformable range. As a result, buckling of the relay pipe 74 can be suppressed.

The picking robot 10 of the present embodiment includes a robot hand 11 that achieves the above effects.

According to this configuration, the picking robot 10 can hold various holding objects P placed in various orientations and situations in the box of the transport source S1 and efficiently transport them to the transport destination S2, for example.

The robot hand 11 of the above embodiment has a pair of parallel links 59, and includes a parallel link type holding unit 21 in which each of the two holding claws 29 opens and closes while moving up and down. Instead of this configuration, the robot hand of the embodiment may include a parallel gripper type holding unit in which the two holding claws move only in the horizontal direction. In this case, contrary to the above embodiment, the distance from the third rotation axis when changing the orientation of the suction portion to the tip of the suction portion may be longer than the distance from the second rotation axis when changing the orientation of the holding unit to the tip of the holding portion. In this case, a configuration may be adopted in which the first rotation axis when the unit is switched and the third rotation axis when the orientation of the suction unit is changed are arranged on a common axis.

Further, in the above embodiment, an example of a robot hand that combines two holding functions of holding and suction, that is, a so-called hybrid hand type robot hand is given. Instead of this configuration, the present invention may be applied to a robot hand provided with a plurality of holding units having the same function, for example, holding only or suction only.

According to at least one embodiment described above, the robot hand 11 has a holding unit 21, a suction unit 22, and a controller 13. The holding unit 21 is rotatably supported by the base plate 20. The holding unit 21 has a holding portion 28 for holding the holding object P. The suction unit 22 is rotatably supported by the base plate 20 independently of the holding unit 21. The suction unit 22 has a suction portion 31 that holds the holding object P. The controller controls the operation of the holding unit 21 and the suction unit 22. The controller 13 rotates the holding unit 21 and the suction unit 22 in a state where the holding portion 28 and the suction portion 31 face different directions, thereby holding either the holding unit 21 or the suction unit 22 as the holding object P. At least one of the holding unit 21 and the suction unit 22 is rotated with respect to the base plate 20 to control the orientation of the holding unit 21 and the suction unit 22 so as to change the orientation with respect to the base plate 20.

As a result, it is possible to realize a robot hand 11 capable of suppressing interference between the holding unit 21 and the suction unit 22 and surrounding obstacles and widening the movable range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover the forms and modifications that fall within the scope and spirit of the inventions.

What is claimed is:

1. A holding device comprising:

a support member;

a first holding unit configured to be rotatably supported by the support member and have a first holding portion configured to hold a holding object;

17 a second holding unit configured to be rotatably supported by the support member independently of the first holding unit and have a second holding portion configured to hold the holding object; and a controller configured to control an operation of the first holding unit and the second holding unit, wherein the controller is configured to switch which of the first holding unit and the second holding unit is used for holding the holding object, by rotating the first holding unit and the second holding unit in a state where the first holding unit and the second holding unit face different directions, and control to change an orientation with respect to the support member, by rotating at least one of the first holding unit and the second holding unit with respect to the support member.

2. The holding device according to claim 1, wherein the first holding unit and the second holding unit are switched by a first rotation drive mechanism so that one of the first holding unit and the second holding unit holds the holding object, and a first rotation axis of the first rotation drive mechanism and a second rotation axis of the holding unit when the orientation is changed is arranged on a common axis.

3. The holding device according to claim 1, wherein the first holding unit and the second holding unit are rotated in a state of facing different directions and integrally with the support member, and either the first holding unit or the second holding unit holds the holding object.

4. The holding device according to claim 1, further comprising:

a second rotation driving mechanism configured to correct an orientation of the second holding unit, by rotating the second holding unit with respect to the support member in a direction that cancels a change in the orientation of the second holding unit due to a change in an orientation of the first holding unit when the first holding unit is rotated when the orientation of the first holding unit is changed.

5. The holding device according to claim 4, wherein a distance from a first rotation axis of the first holding unit to a tip of the first holding portion is longer than a distance from a second rotation axis of the second holding unit to a tip of the second holding portion.

6. The holding device according to claim 1, wherein the support member has a first surface and a second surface opposite to the first surface, the first holding unit and the second holding unit are arranged so as to face the first surface of the support member, and at least a part of the support member, at least a part of the first holding unit, and at least a part of the second holding unit are arranged so as to overlap each other when viewed from a normal direction of the first surface.

7. The holding device according to claim 6, wherein, in a state where the first holding portion and the second holding portion are oriented 180° differently from each other in a plane parallel to the first surface, a first holding center line of the first holding unit and a second holding center line of the second holding unit are arranged on a same straight line.

8. The holding device according to claim 7, wherein the first holding portion and the second holding portion are located at positions symmetrical with each other.

9. The holding device according to claim 1, further comprising:

a third rotation drive mechanism configured to change an orientation of the second holding portion in the second holding unit by rotating the second holding portion.

10. The holding device according to claim 1, wherein the first holding unit is a holding unit having a plurality of holding parts and configured to hold an article in a state of being held by the plurality of holding parts, the second holding unit is a suction unit having a suction pad and configured to hold an article in a state of being negatively sucked by the suction pad.

11. The holding device according to claim 10, wherein the holding parts are holding claws.

12. The holding device according to claim 10, wherein the support member has a first surface and a second surface opposite to the first surface, the suction unit is arranged so as to face the first surface of the support member, the holding unit is arranged on a side opposite to a side where the support member is located with respect to the suction unit, and a negative pressure supply pipe that transports a negative pressure to the suction pad is arranged so as to face the second surface of the support member, and is connected to an opening of the suction unit that is exposed from the support member.

13. The holding device according to claim 12, wherein the negative pressure supply pipe is arranged so as to wind from the opening to the suction pad in a direction opposite to a direction in which the suction unit rotates.

14. The holding device according to claim 13, wherein the suction unit has a suction unit base material, a pipe joint provided on the suction unit base material and communicating with the negative pressure supply pipe, and a relay pipe connecting the pipe joint and the suction pad, and at least a part of the relay pipe is spirally arranged in a space between the pipe joint and the suction pad.

15. A conveying system comprising:

the holding device according to claim 1; and an arm configured to be controlled by a controller and move the holding device.

\* \* \* \* \*